UNITED STATES PATENT OFFICE.

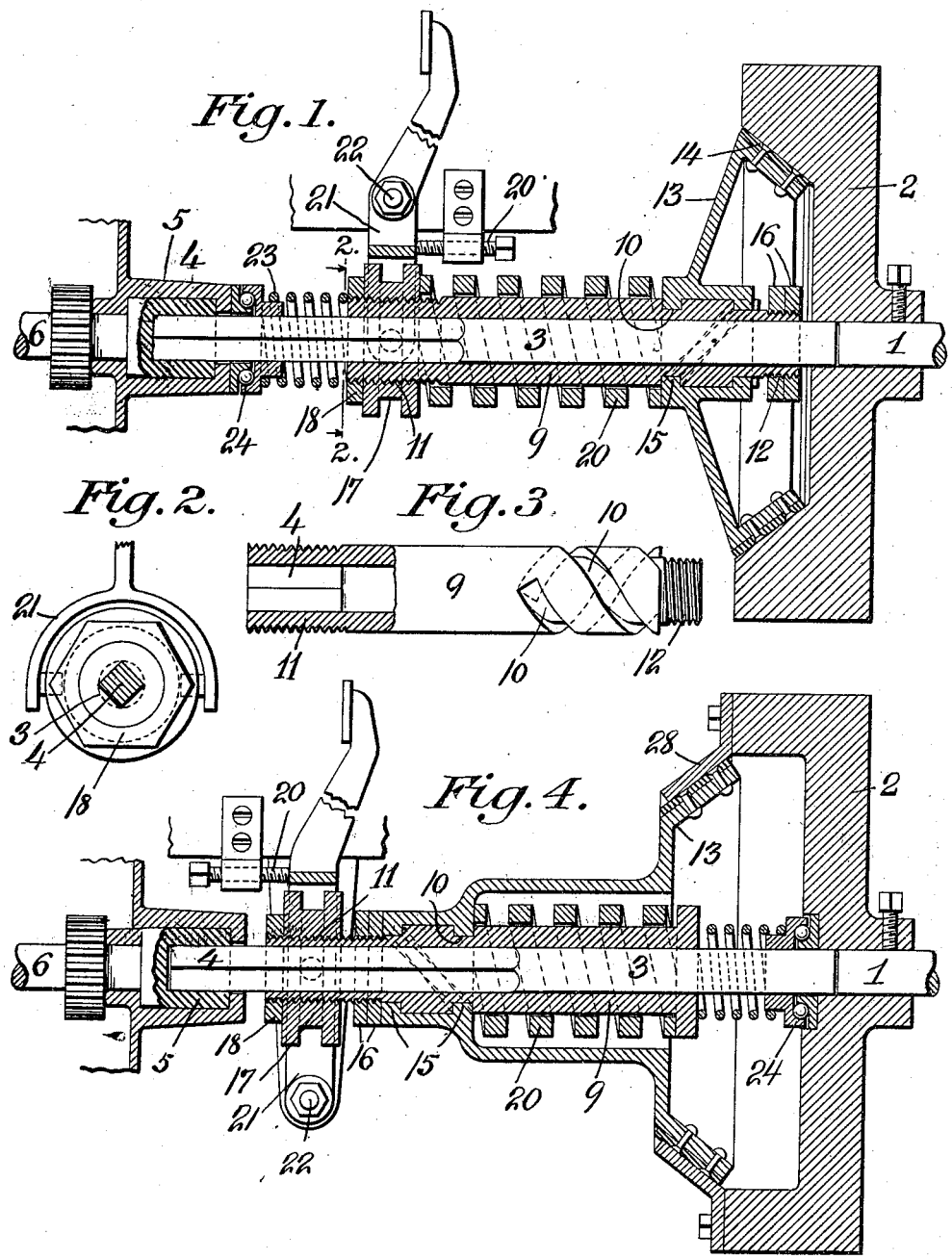

MORRIS B. IRELAND, OF NEW YORK, N. Y.

CLUTCH.

1,014,826.

Specification of Letters Patent.   Patented Jan. 16, 1912.

Application filed January 22, 1909. Serial No. 473,613. REISSUED

*To all whom it may concern:*

Be it known that I, MORRIS B. IRELAND, a citizen of the United States, residing at New York, in the county of New York and State of New York, have invented certain new and useful Improvements in Clutches, of which the following is a full, clear, and exact specification.

This invention relates to clutches, and has particular reference to a clutch of the type wherein a driving engagement between two shafts automatically releases upon a predetermined load being applied to the driven shaft whereby the strain on the engine and other damage may be prevented.

More particularly, the invention relates to a clutch mechanism for use in automobiles wherein the road shocks are prevented from being transmitted to the engine when the clutch is engaged, and also preventing the breaking of the gears in changing the speed and reversing, as well as in starting. For instance, a driver frequently attempts to start a vehicle upon too high a gear, which strains the gears, slips the wheels with damage to the tires or overloads the engine. By means of this invention, in case the vehicle is started at too high a speed, the engagement is automatically released to such an extent as to permit a certain amount of lost motion and slip between the driving and driven shaft, and thereby the vehicle starts slowly and without straining the parts or skidding the wheels.

The invention will be more fully understood in connection with the description of the accompanying drawings, wherein—

Figure 1, is a longitudinal section of a clutch mechanism embodying the invention, the clutch moving away from the driving shaft to disengage. Fig. 2 is a cross section on the line 2—2 of Fig. 1. Fig. 3 is a detail of the worm shaft carrying the movable clutch member; and Fig. 4 is a longitudinal section of a modified form wherein the movable clutch member moves toward the driven shaft in order to disengage, certain parts being reversed as shown in Fig. 1, to accomplish this purpose.

1 represents a driving shaft having a driving clutch member 2 thereon.

3 represents an intermediate shaft having a bearing at one end in the driving clutch member, and squared as at 4, at the other end to engage a bushing 5 carried by the driven shaft 6. Mounted on the intermediate shaft 3 to rotate therewith is a longitudinally movable sleeve 9 provided with spiral worm grooves 10 and threaded at its opposite ends as at 11 and 12 respectively.

13 is a movable clutch member having the engaging surface 14 and internal threads 15 to engage in the grooves 10 of the sleeve 9.

16 represent lock nuts forming an abutment on the threaded end 12 of the shaft and limiting the forward movement of the movable clutch member 13 in the grooves 10.

17 is an operating collar threaded on the portion 11 of the sleeve 9 and locked by a nut 18. This collar 17 also acts as an abutment for the spring 20. Between the collar and the hub of the movable clutch member 13 is interposed a spring 20 proportioned to balance at a certain compression, the predetermined load which the clutch is to transmit. The load to be transmitted by the clutch without disengagement is adjusted by means of a set screw 30 bearing on the operating lever 21 pivoted at 22 on the frame of the machine.

23 is a spring interposed between the thrust bearing 24 and the movable sleeve 3 for holding the movable clutch member 13 in engagement with the driving clutch member 2, one member of the thrust bearing constituting an abutment for the spring 23.

The operation of the clutch will be understood from reference to Fig. 1, assuming the driving shaft 1, and the driving clutch member 2 to be rotating counter-clockwise when viewed in the direction of the arrows in Fig. 1 and Fig. 2. The pitch of the worm 10 is so high that the spring 20 normally tends to push the clutch member 13 toward the abutment 16, and at the same time the spring 23 is pushing the sleeve 9 with the clutch member 13 mounted thereon bodily toward the clutch member 2 to effect the driving engagement. The clutch being engaged, it will be seen that the driving torque tends to revolve the clutch member 13 on the worm 10 backward on the sleeve 9, and the spring 20 opposes the longitudinal component of this force, thus tending to balance this force and permit the spring 23 to hold the clutch in engagement. If now the longitudinal backward component of the torque exerted on the clutch member 13 exceeds the longitudinal forward component of the force exerted thereon by the spring 20, the clutch member will be rotated on sleeve 9 causing sleeve 9 to screw through clutch member 13 until operating collar 17 has drawn operating lever 21 toward clutch member 2 and against the set screw 30 which causes all movement in sleeve 9 toward clutch member 2 to stop, when this has taken place the clutch member 13 will, if strain is strong enough, rotate backward along sleeve 9 away from clutch member 2 thus causing the disengagement of clutch member 13 from clutch member 2. Also, it will be seen that there is a certain amount of lost motion without disengagement or slipping of the clutch to the extent that the movable clutch member is rotated relatively to the sleeve 9, so that the automatic relaxation of the driving torque is effected at first by the forward movement toward clutch member 2 of sleeve 9 through clutch member 13 until sleeve 9 is stopped by operating lever coming against set screw 30, and then by the slipping of driving clutch member 2 relatively to driven clutch member 13. It can now be seen that the set screw 30 will determine the compression of the spring 23 when the clutch is engaged and thereby the amount of load which the clutch would transmit before there is any lost motion. From another point of view, if the spring 20 be assumed as omitted and the members 2 and 13 in engagement, the latter would simply turn backward on the worm when engaged because of its high pitch and thereby not transmit any power, so that the function of the spring 20 is broadly to oppose this tendency and hold the movable member 13 in engagement with the driving member 2. In the case of overload, the spring 20 tends to be compressed by the backward movement of the clutch 13 on the sleeve 9 and thereby becomes stronger while the spring 23 tends to expand and move the sleeve 9 bodily forward to maintain the driving engagement. Eventually if the forward movement of sleeve 9 toward clutch member 2 through clutch member 13 continues sleeve 9 will be compelled to stop its forward movement by reason of being held by operating lever 21 which in turn will come in contact with set screw 30. Then clutch member 13 will rotate backward on sleeve 9 against spring 20 and as sleeve 9 can not move forward and clutch member rotates backward away from clutch member 2, it will be seen that their backward movement away from clutch member 2 of clutch member 13 will cause the disengagement or slipping of the two parts. When the foot lever 21 is depressed to disengage the clutch, the spring 23 is compressed and this permits the spring 20 to push the clutch member 13 forwardly on the worm 10 until it strikes the abutment 16, the driving surfaces being all at this time in engagement. When the movable clutch member 13 can go no farther forward by reason of the abutments 16, the actual disengagement of the driving surfaces commences, it being assumed that the operator is during all of this time depressing the foot lever 21. It can thus be seen that the clutch disengages gently as well as engages gently, which is an important advantage of this invention.

In Fig. 4 the parts are somewhat differently arranged but operate in the same manner. In this case the thrust bearing 24 is located within the driving clutch member $2^a$ which is provided with a detachable friction ring 28, and the driven clutch member $13^a$ is within the member 28 and formed as a sleeve to inclose the spring $20^a$, the worm threads $15^a$ being at the rear end immediately adjacent the abutment nuts $16^a$. Also, the pitch of the worm is reversed and likewise the adjusting nut 30 by reason of the location of the pivot $22^a$ of the lever $21^a$ at the lower end instead of at the middle as in Fig. 1. Also, the spring 23 is interposed between the forward end of the sleeve 9 which forms an abutment and the thrust bearing 24 located in the driving clutch member $2^a$. In both forms it will be seen that the operating tension of the spring $20^a$ may be adjusted where desired to suit the vehicle by means of the collar 17 and the nut 18 which are threaded on the sleeve $9^a$ at the end 11, and that the amount of elastic torque can be controlled by set screw 30.

It will be understood that the above described clutch is capable of use in various other relations than simply between the engine and the change speed gear of an automobile, such for instance, as a substitute for the differential gear between the two wheels, and for various other purposes where one shaft is to be driven by another intermittently or at a different ratio.

It will be understood that the invention is not to be restricted to the particular construction and arrangement herein described, as various modifications and changes may be made without departing from the scope of the invention.

Having thus described my invention I declare that what I claim as new and desire to secure by Letters Patent is,—

1. The combination with a driving and a driven shaft, of coöperating clutch members carried by said shafts, one of said clutch members being movably mounted to releasably engage the other member, and means whereby upon a predetermined load the shaft carrying one of said clutch members is permitted to rotate differentially with respect to said clutch member.

2. The combination with a driving and a driven shaft, of a releasable clutch connection between the two shafts, said clutch including a movable member mounted on one of said shafts for clutching the other shaft, and means whereby upon a predetermined load, the movable clutch member is moved in a direction tending to release the driving connection and relatively to its shaft.

3. The combination with a driving and a driven shaft, of a releasable clutch connection between the two shafts, said clutch including a member mounted to move longitudinally on one of said shafts toward and from the other clutch member, means for holding the clutch members in engagement, and means whereby upon a predetermined load the movable clutch member is moved longitudinally and rotated relatively to its shaft to relieve the driving torque.

4. The combination with a driving and a driven shaft, of a friction clutch for releasably connecting said shafts, means for holding the clutch in engagement, means whereby the engagement of the clutch tends to automatically effect a release independently of the holding means, and yielding means separate from the holding means for opposing such release and adapted to overcome said holding means at a predetermined load.

5. The combination with a driving and a driven shaft, of clutch members coöperating to couple said shafts, one of said clutch members being movable toward and from the other, a movable sleeve carrying said clutch member, said clutch member being threaded thereon, means tending to move the sleeve to engage the clutch members, and a spring carried by the sleeve and resiliently holding the movable clutch member from turning backward on said sleeve when engaged.

6. The combination with a driving and a driven clutch member, of a spring for holding said members engaged, a sleeve carrying a clutch member and moved by said spring to engage the clutch members, said clutch member carried by the sleeve being movably mounted thereon to have a relative spiral movement when engaged, and a spring carried by said sleeve and opposing such spiral movement.

7. The combination with a driving clutch member, of a driven shaft, a sleeve having an abutment and splined on said driven shaft, a driven clutch member rotatably and longitudinally movable on said sleeve, a spring on said sleeve bearing against said driven clutch member and said abutment on said sleeve, a second spring between an abutment on said driven shaft and said sleeve, and operating means for said sleeve.

8. The combination with a driving clutch member, of a driven shaft, a sleeve having an abutment and splined on said driven shaft, a driven clutch member rotatably and longitudinally movable on said sleeve, a spring on said sleeve bearing against said driven clutch member and said abutment on said sleeve, a second spring between an abutment on said driven shaft and said sleeve, means limiting the movement of said sleeve to clutching position, and operating means for said sleeve.

9. The combination with a driving and a driven shaft, of coöperating clutch members carried by said shafts, the driven clutch member being movably mounted on the driven shaft to releasably engage the driving clutch member, means for holding the members in engagement, and means whereby upon a predetermined load the shaft carrying the driven clutch member is permitted to rotate differentially with respect to said driven clutch member a predetermined amount, and to thereupon reduce the holding force and permit the clutch members to slip.

In testimony whereof I affix my signature, in presence of two witnesses.

MORRIS B. IRELAND.

Witnesses:
   J. S. Wooster,
   Geo. N. Kerr.